(12) United States Patent
Winick et al.

(10) Patent No.: US 7,564,696 B1
(45) Date of Patent: Jul. 21, 2009

(54) PCI BRACKET RETAINER FOR ADAPTER CARD APPLICATIONS

(75) Inventors: Alan L. Winick, Santa Clara, CA (US); Michael T. Milo, Santa Clara, CA (US); Steven T. Sprouse, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 472 days.

(21) Appl. No.: 11/366,844

(22) Filed: Mar. 1, 2006

(51) Int. Cl.
*H05K 7/12* (2006.01)

(52) U.S. Cl. ............... 361/801; 361/759; 361/732; 361/747; 361/726; 361/755; 312/223.2

(58) Field of Classification Search ............. 361/801, 361/759, 747, 740, 726, 732, 755; 312/223.2, 312/223.3
See application file for complete search history.

(56) References Cited

U.S. PATENT DOCUMENTS

| 6,960,720 | B2* | 11/2005 | Wen-Lung | 174/50 |
| 7,054,164 | B2* | 5/2006 | Shih-Tsung | 361/801 |
| 2005/0265007 | A1* | 12/2005 | Gordon | 361/755 |

* cited by examiner

*Primary Examiner*—Dameon E Levi
(74) *Attorney, Agent, or Firm*—Martine Penilla & Gencarella, LLP.

(57) ABSTRACT

A bracket retainer is provided for securing an adapter card in a computer chassis in manner that maintains the electrical and the mechanical stability of the computer chassis and adapter card. This bracket retainer approach secures the adapter card to the computer chassis by utilizing a rotating door structure that allows the adapter card to be tightened into its card connector, as a rear tab of the adapter card, which is protruding through an opening of a rear panel of the computer chassis, is engaged by the rotating door structure. This bracket retainer approach also allows the bracket retainer to be secured to the computer chassis by interlocking the door structure with a top cover of the computer chassis.

17 Claims, 6 Drawing Sheets

PCI BRACKET RETAINER FOR ADAPTER CARD APPLICATIONS

BACKGROUND

1. Field of the Invention

The invention relates generally to the integration of adapter cards with computer chassis architectures, and more particularly to an apparatus for securing an adapter card to a computer chassis in an electrically and mechanically stable manner where the adapter card includes a rear tab that protrudes through an opening of a rear panel of the computer chassis.

2. Description of the Related Art

Computers that use standard PCI adapter cards need to provide a mechanism to retain the PCI adapter card in a computer/workstation chassis in a manner that maintains electrical and mechanical stability. In particular, where the PCI adapter card includes a rear tab and the PCI adapter card is mounted in the chassis so that the rear tab of the PCI adapter card protrudes through an opening at the rear panel of the chassis, problems are presented involving closing the opening in a manner that alleviates undesirable Electromagnetic Interference (EMI) noise leakage and mechanically secures the PCI adapter card in the chassis.

In view of the forgoing, there is a need for an approach for securing an adapter card in a computer chassis in a manner that provides enhanced electrical and mechanical stability.

SUMMARY

In one embodiment, the present invention provides a bracket retainer for securing an adapter card in a computer chassis. The computer chassis includes a card connector, a top cover, and a panel that includes a first opening and a second opening where a tab portion of the adapter card protrudes through the first opening or the second opening of the computer chassis. The bracket retainer includes a first door structure and a second door structure. The first door structure forms a closure of the first opening where the adapter card is capable of being secured when the tab portion of the adapter card is engaged by the first door structure. The second door structure forms a closure of the second opening where the adapter card is capable of being secured when the tab portion of the adapter card is engaged by the second door structure.

In another embodiment, the present invention provides a bracket retainer for securing an adapter card in a computer chassis. The computer chassis includes a top cover and a panel that includes an opening where a tab portion of the adapter card protrudes through the opening of the panel. The bracket retainer includes a rotating door structure attached to a surface of the panel and a projection integral with the rotating door structure. The rotating door structure forms a closure of the opening wherein the adapter card is secured when the tab portion of the adapter card is engaged by the rotating door structure. The projection is capable of securing the rotating door structure in a closed position Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

An approach is provided that enhances electrical and mechanical stability in the attachment of an adapter card to a computer chassis. In particular, the approach includes a Bracket Retainer that provides enhanced electrical and mechanical stability where, for example, an adapter card is mounted in the computer chassis and a tab portion of the adapter card protrudes through an opening at a rear panel of the computer chassis. This bracket retainer approach forms a closure for the panel opening and simultaneously secures the adapter card in the computer chassis by utilizing a rotating door structure that allows the adapter card to be tightened into its card connector as the tab of the adapter card is engaged by the rotating door structure.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The present invention includes several aspects and is presented below and discussed in connection with the Figures and embodiments. First, an exemplary PCI adapter card and an exemplary computer chassis are presented. Next, embodiments of the features of a PCI Bracket Retainer of the present invention are discussed.

Figure 1:
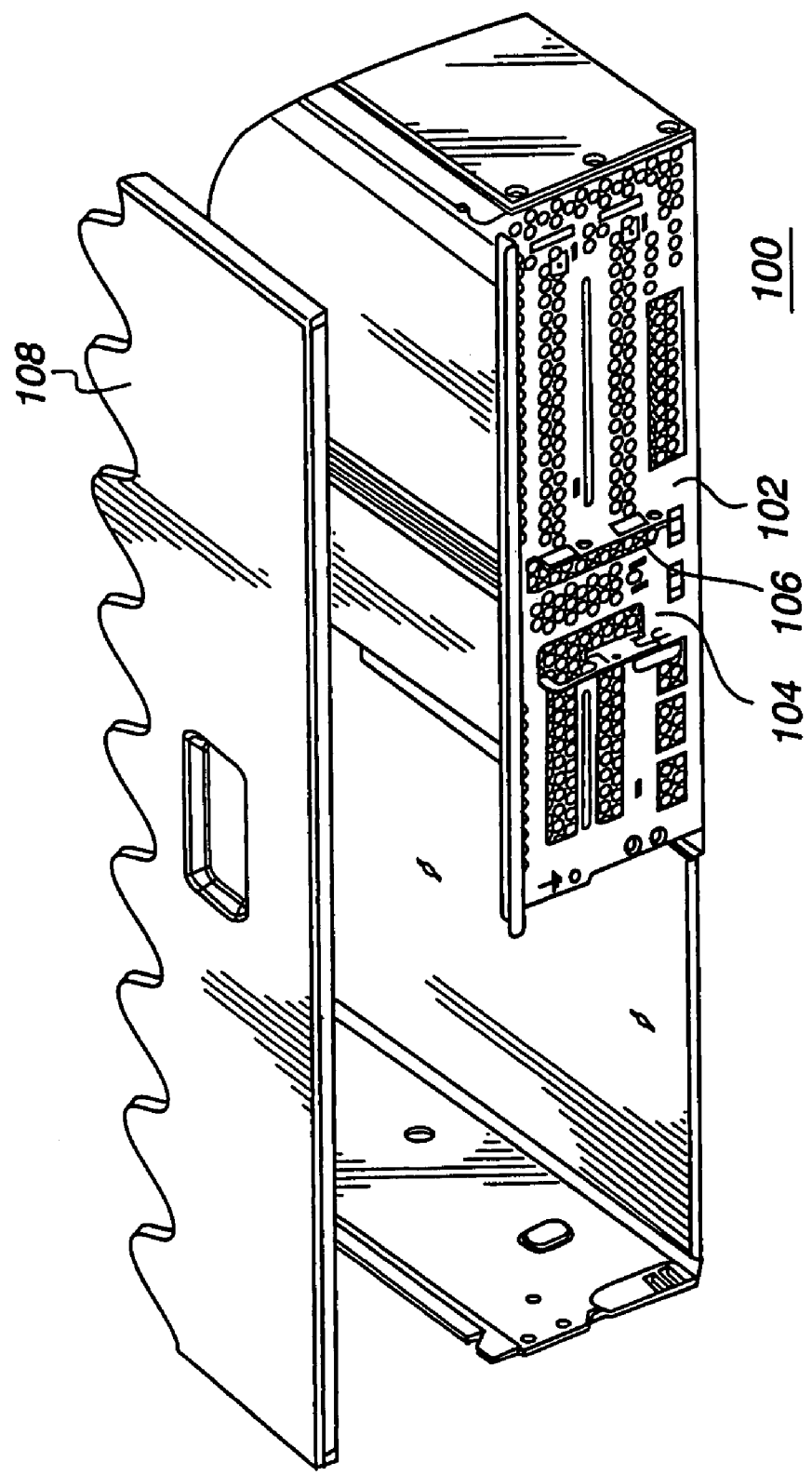
FIG. 1 is a generalized isometric illustration of an exemplary computer chassis.

In FIG. 1, an exemplary Computer Chassis 100 is shown for illustrative purposes. The Computer Chassis 100 includes a Card Connector (not shown), a rear PCI Filler Panel 102 that includes adjacent Opening(s) 104 and 106, and a Top Cover 108. Although a 2U chassis architecture is shown in FIG. 1, it is important to note that the embodiments of the present invention are relevant to other chassis architectures including, but not limited to, 1U chassis architectures, server chassis architectures, etc.

Figure 2:
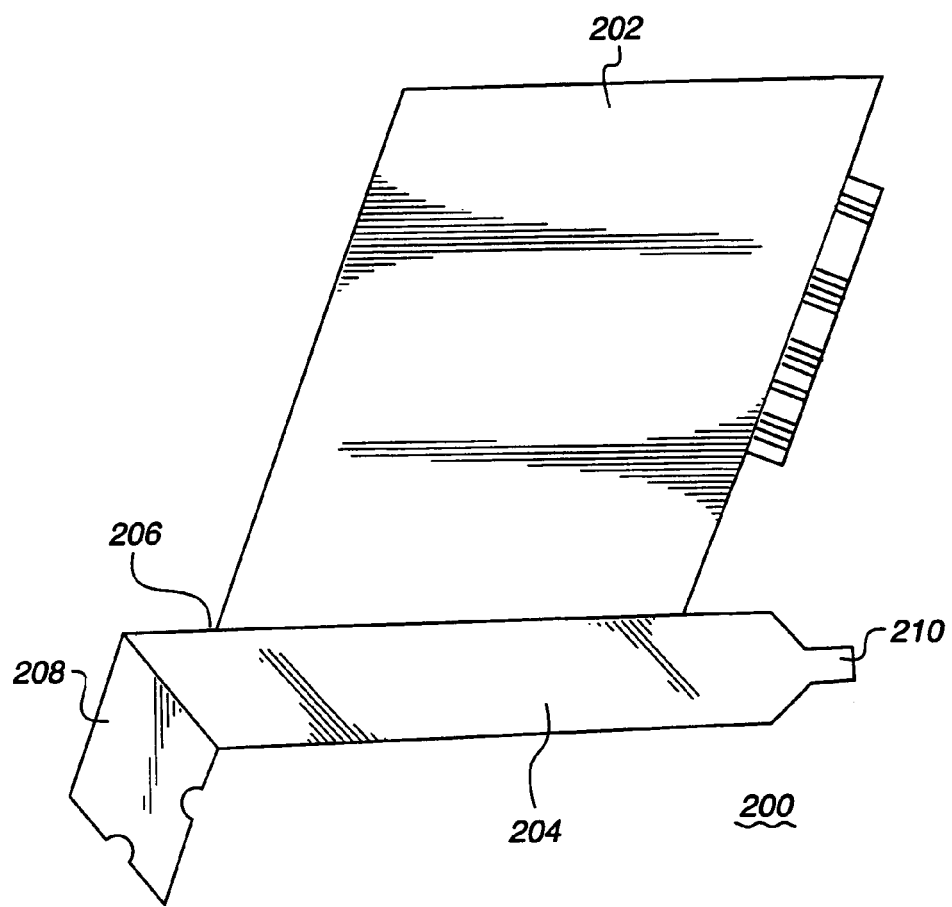
FIG. 2 is a generalized isometric illustration of an exemplary PCI adapter card.

In FIG. 2, an exemplary PCI Card Adapter (or Adapter Card) 200 is shown for illustrative purposes. The PCI Card Adapter 200 includes a PCI Card 202, and an Input/Output (I/O) Bracket 204 mounted to an I/O Side 206 of the PCI Card 202. The I/O Bracket 204 includes a bent rear Tab Portion 208 opposite a Tail Portion 210. Generally, the PCI Adapter Card 200 is mounted in the Computer Chassis 100 of FIG. 1 so that a surface of the I/O Bracket 204 is proximal to (or flush with) an inside surface of the PCI Filler Panel 102 (see FIG. 1) and the Tab Portion 208 of the I/O Bracket 204 protrudes through an Opening 104, 106 (see FIG. 1) of the Computer Chassis 100. It should be understood, however, by those of ordinary skill in the art that the embodiments of the present invention are not only applicable to PCI card adapters, but to other adapter cards having bent-tab configurations, etc. It should also be understood that embodiments of the present invention are not limited to the use of riser card(s) to mount the adapter card in the mother board and the adapter card can be mounted in any manner in the computer chassis including, but not limited to, horizontally (i.e. substantially parallel to the mother board), vertically, etc.

Figure 3A:
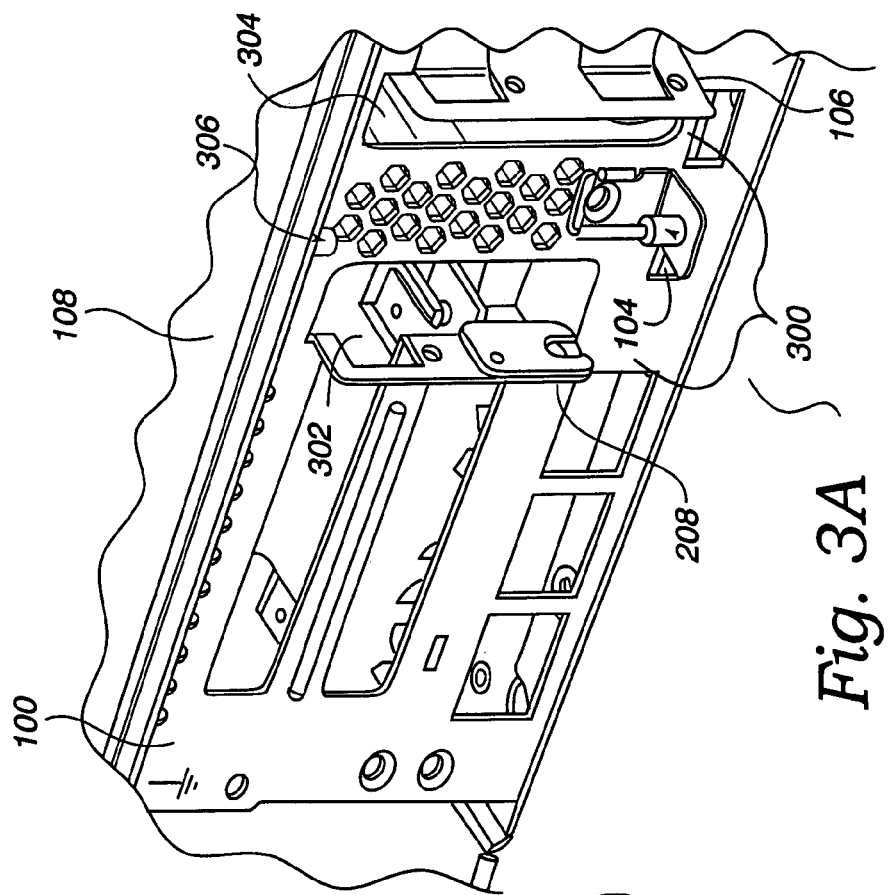
FIG. 3A is an isometric illustration of a computer chassis and a bracket retainer having a first door structure and a second door structure, in accordance with an embodiment of the present invention.
Figure 3B:
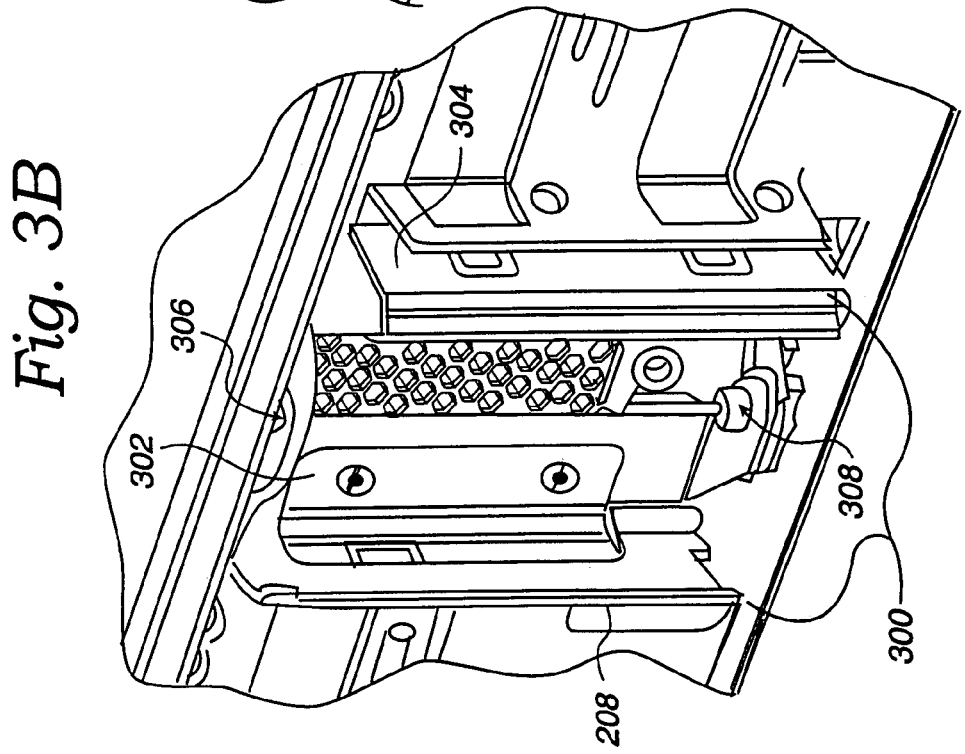
FIG. 3B is a blowout illustration of the bracket retainer of FIG. 3A.
Figure 4A:
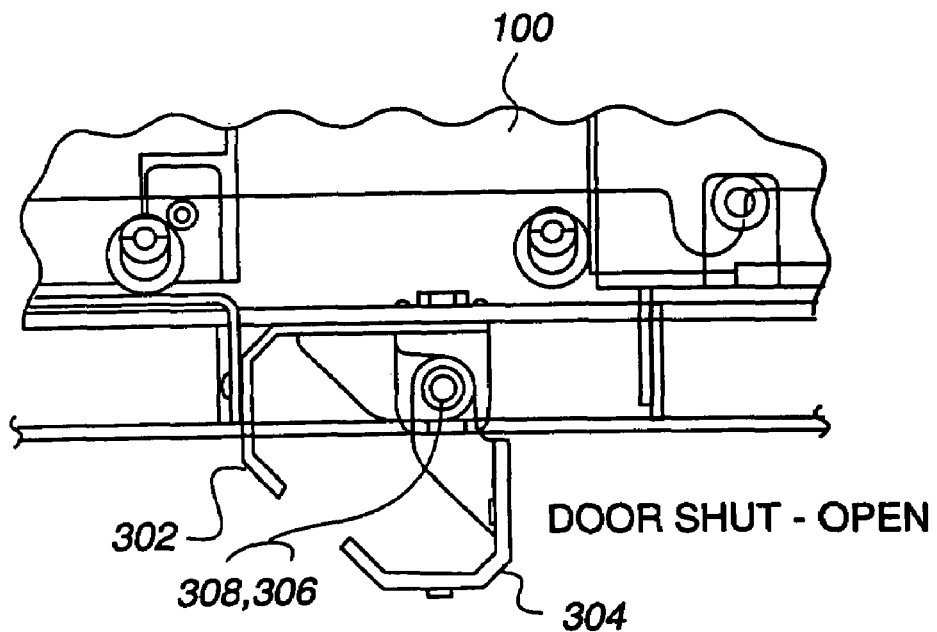
FIG. 4A is top view illustration of a computer chassis and a bracket retainer having a first door structure that is closed and a second door structure that is open, in accordance with an embodiment of the present invention.
Figure 4B:
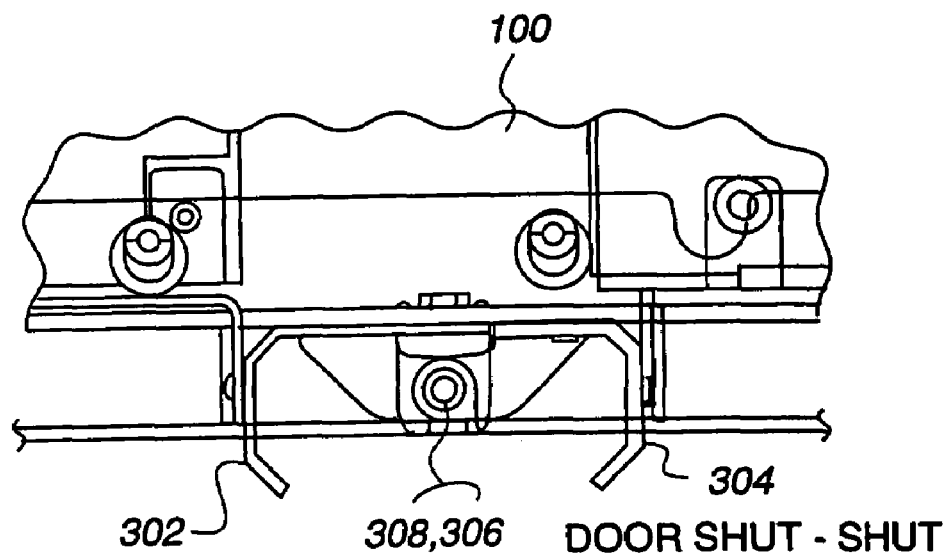
FIG. 4B is a top view illustration of a computer chassis and a bracket retainer having a first door structure that is closed and a second door structure that is closed, in accordance with an embodiment of the present invention.

In FIGS. 3 and 4, a Bracket Retainer 300 is illustrated in accordance with an embodiment of the present invention. The Bracket Retainer 300 overcomes the problems presented with securing bent-tab configured adapter cards in a computer chassis by utilizing a mechanism which provides closures for sealing computer chassis Opening(s) 104, 106 to prevent EMI noise leakage etc. and provides an approach for mechanically securing PCI Adapter Cards 200 (or any other bent-tab configured adapter card, etc.) in a Computer Chassis 100. Specifically, in one embodiment of the present invention, as shown in FIGS. 3A and 3B, the Bracket Retainer 300 utilizes rotating Door structures 302, 304 that are attached to the Rear Filler Panel 102 of the Computer Chassis 100. Specifically, as shown in FIGS. 4A and 4B, the Door structures 302, 304 rotate about upper and lower Hinge Pins 306, 308 (see also FIG. 5D) along a vertical axis etc. to seal the Openings 104, 106 and to securely tighten the Adapter Cards 200 into their Card Connectors (not shown) when a Tab Portion 208 of an Adapter Card 200 (which is protruding through an Opening 104, 106) is engaged by closing a corresponding Door structure 302, 304. FIG. 4A illustrates a top view of the Door structure 302 in a closed position and the Door structure 304 in an open position. FIG. 4B illustrates a top view the both of the Door structures 302, 304 in closed positions. It is important to note that in the absence of a Tab Portion 208 of an Adapter Card 200 protruding through a particular Opening 104, 106, the Door structure 302, 304 corresponding to the Opening still provides a closure for sealing the computer chassis Opening(s) 104, 106 to prevent EMI noise leakage etc.

In FIG. 5, embodiments of the Door structures 302, 304 are illustrated in further detail. Referring first to FIG. 5A, in one embodiment of the present invention, a first Door structure 302 includes a Projection 500, a Retainer structure 502, a Spring structure 504, and an Aperture 506 opposite an Aperture 508 for attaching the Retainer structure 502 to a Rear Panel 102 of the Computer Chassis 100. Referring still to FIG. 5A, the Door structures 302 and 304 are mirror images of one another and, therefore, a second Door structure 304 includes a Projection 510, a Retainer structure 512, a Spring structure 514, and an Aperture 516 opposite an Aperture 518 for attaching the Retainer structure 512 to the Rear Panel 102 of the Computer Chassis 100. By providing the Door structures 302, 304 as corresponding mirror images of each other, fabrication costs are significantly reduced because the same fabrication mold, or process, etc. can be used for both door structures.

Figure 5A:
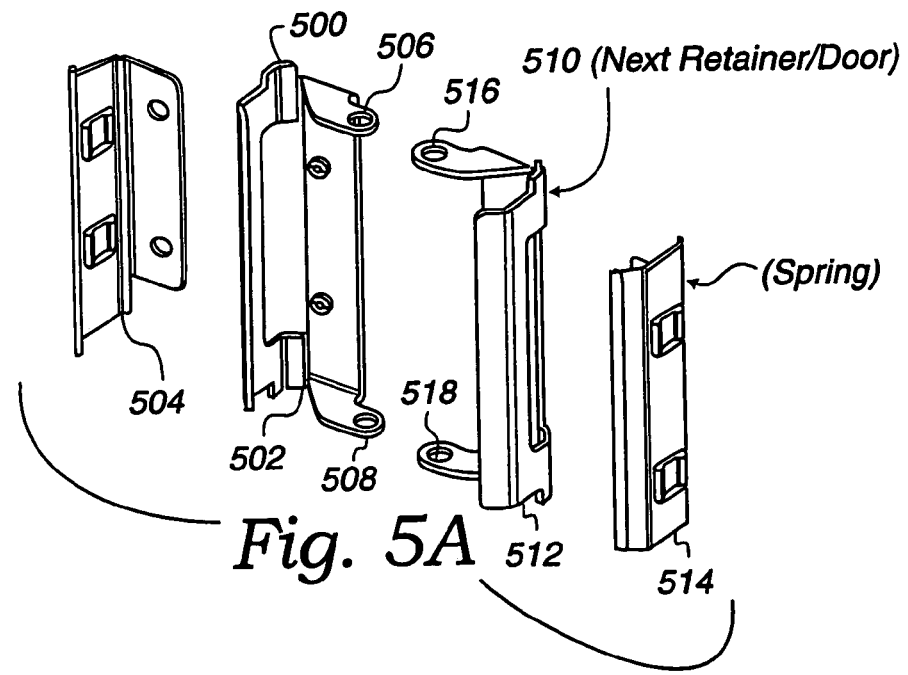
FIG. 5A is an isometric illustration of a first retainer structure, a second retainer structure, a first spring structure, and a second spring structure, in accordance with an embodiment of the present invention.
Figure 5B:
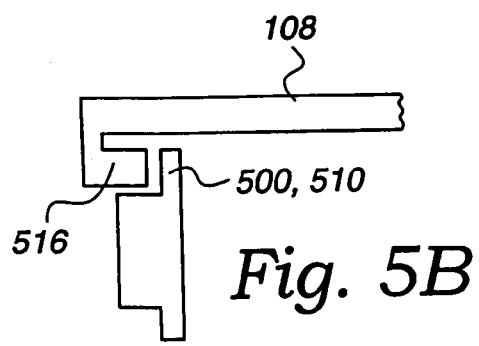
FIG. 5B is an isometric illustration of a projection of a retainer structure interlocking with a lip portion of a top cover, in accordance with an embodiment of the present invention.
Figure 5C:
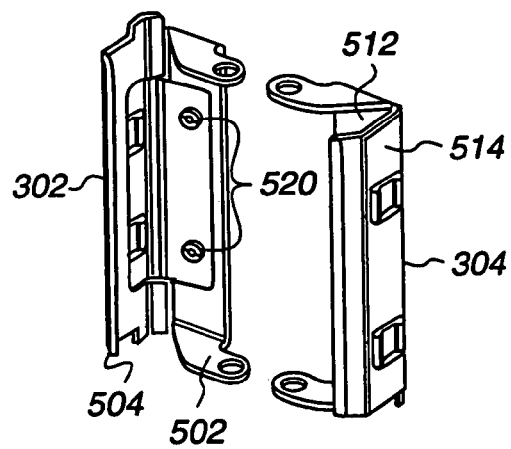
FIG. 5C is an isometric illustration of a first door structure and a second door structure, in accordance with an embodiment of the present invention.

Referring next to FIG. 5B, in another embodiment of the present invention, the Projections 500, 510 of the Retainer structures 502, 512 are provided to lock the PCI Bracket Retainer 300 in place by securing each Door structure 302, 304 in a closed position by utilizing the Top Cover 108 of the Computer Chassis 100. Specifically, to implement a lock between the PCI Bracket Retainer 300 and the Computer Chassis 100, each Projection 500, 510 of the Door structures 302, 304 interlocks under a "lip" portion 516 of the Top Cover 108 so that when the Top Cover 108 is in place, each Door structure 302, 304 of the PCI Bracket Retainer 300 is held in a closed position. Referring next to FIG. 5C, the Retainer structure 502 and the Spring structure 504 are integrated together (e.g. utilizing Rivets 520, etc.) to form the Door structure 302 discussed above. Likewise, the Retainer structure 512 and the Spring structure 514 are integrated together (e.g. utilizing Rivets 520, etc.) to form the Door structure 304 also discussed above. In one embodiment of the present invention, to provide Door structures 302, 304 that are both mechanically stable and mechanically compliant and that provide optimal retention, feel force, etc., each Retainer structure 502, 512 is formed of a rigid (non-compliant, thick-gage, etc.) material that provides the Door structures 302, 304 with mechanical stability. Each Spring structure 504, 514 is formed of a flexible (compliant, thin-gage, etc.) material that provides the Door structures 302, 304 with consistent force tolerances so that the Door structures 302, 304 can flex to accommodate adapter cards which can have different I/O bracket thicknesses, shapes, configurations, etc. In one embodiment of the present invention, the Retainer structures 502, 512 and Spring structures 504, 514 can be formed of any conductive material including, but not limited to, sheet metal, cast-molded metal, metallized plastic with conductive foam, etc.

Figure 5D:
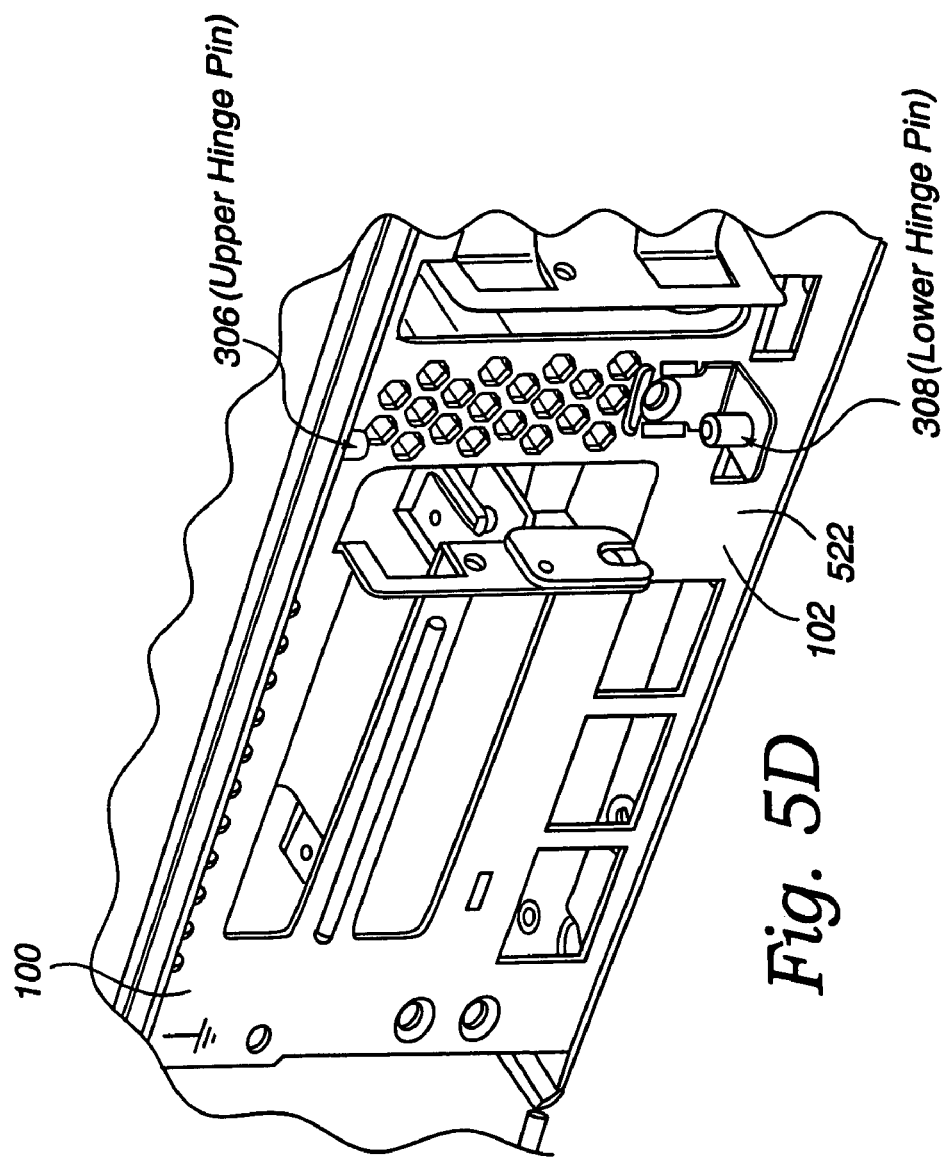
FIG. 5D is an isometric illustration of a first hinge pin structure and a second hinge pin structure attached to a rear panel of a computer chassis, in accordance with an embodiment of the present invention.

Referring to FIG. 5D, in another embodiment of the present invention, the Door structures 302, 304 of the PCI Bracket Retainer 300 are attached etc. to an Outer Surface 522 of the Rear Filler Panel 102 of the Computer Chassis 100 utilizing upper and lower Hinge Pins 306, 308 which can share a vertical etc. axis of rotation. Specifically, the Apertures 506,508 and 516,518 of the Retainer structures 502, 512 are mounted over the Hinge Pins 306, 308 so that the Door structures 302, 304 overlap and stagger, as shown in FIG. 3B. It is important to note, however, that the embodiments of the present invention are not limited to the Hinge Pin 306, 308 and Aperture 506,508 and 516,518 attachment mechanism discussed above. In fact, any mechanism for attaching the rotating Door structures 302, 304 of the PCI Bracket Retainer 300 to the Rear Filler Panel 102 of the Computer Chassis 100 can be used with the present invention including, but not limited to an aperture and, a rotating screw, a bent sheet metal tab, or a dowel (e.g., wire, wooden, or plastic).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A bracket retainer for securing an adapter card in a computer chassis, the computer chassis comprising a panel, wherein the panel comprises a first opening, and a second opening, and wherein a tab portion of the adapter card protrudes through the first opening or the second opening, the bracket retainer comprising:
   a first door structure, the first door structure forming a closure of the first opening wherein the adapter card is capable of being secured when the tab portion of the adapter card is engaged by the first door structure and a first retainer structure, the first retainer structure including,
      a first projection, wherein the first projection is capable of interlocking with a top cover of the computer chassis to secure the first door structure in a closed position,
   a first means for attaching the first retainer structure to the computer chassis;
   a second door structure, the second door structure and the first door structure integrally attached to a surface of the panel, the second door structure forming a closure of the second opening wherein the adapter card is capable of being secured when the tab portion of the adapter card is engaged by the second door structure; and
   a third structure disposed on a surface of the panel between the first opening and the second opening, wherein the first means for attaching the first retainer structure to the computer chassis and a first means for attaching a second retainer structure to the computer chassis are integral with the third structure wherein the first door structure is capable of rotating about the third structure to form the closure of the first opening and the second door structure is capable of rotating about the third structure to form the closure of the second opening.

2. The bracket retainer as recited in claim 1, wherein the computer chassis is a 1U chassis or a 2U chassis.

3. The bracket retainer as recited in claim 1, wherein the panel is a Peripheral Component Interconnect (PCI) filler panel.

4. The bracket retainer as recited in claim 1, wherein the surface is an outer surface of the panel.

5. The bracket retainer as recited in claim 1, wherein the first door structure further comprises:
   a second means for attaching the first retainer structure to the computer chassis, wherein the second means for attaching the first retainer structure to the computer chassis is disposed opposite the first means for attaching the first retainer structure to the computer chassis; and
   a first spring structure integral with the first retainer structure to form the first door structure.

6. The bracket retainer as recited in claim 5, wherein the first retainer structure and the first spring structure are formed of a conductive material.

7. The bracket retainer as recited in claim 5, wherein the first retainer structure is formed of a rigid material and the first spring structure is formed of a flexible material.

8. The bracket retainer as recited in claim 5, wherein the second retainer structure further comprises:
   a second projection, wherein the second projection is capable of interlocking with the top cover to secure the second door structure in a closed position,
   a second means for attaching the second retainer structure to the computer chassis, wherein the second means for attaching the second retainer structure to the computer chassis is disposed opposite the first means for attaching the second retainer structure to the computer chassis; and
   a second spring structure integral with the second retainer structure to form the second door structure.

9. The bracket retainer as recited in claim 8, wherein the second retainer structure and second spring structure are formed of a conductive material.

10. The bracket retainer as recited in claim 8, wherein the second retainer structure is formed of rigid material and the second spring structure is formed of a flexible material.

11. The bracket retainer as recited in claim 1, wherein the third structure is a hinge pin.

12. A bracket retainer as recited in claim 8, further comprising:
   a fourth structure opposite the third structure and disposed on the surface of the panel between the first opening and the second opening, wherein the second means for attaching the first retainer structure to the computer chassis and the second means for attaching the second retainer structure to the computer chassis are integral with the fourth structure wherein the first door structure is capable of rotating about the fourth structure to form the closure of the first opening and the second door structure is capable of rotating about the fourth structure to form the closure of the second opening.

13. A bracket retainer as recited in claim 12, wherein the fourth structure is a hinge pin.

14. A bracket retainer as recited in claim 1, wherein engaging the tab portion of the adapter card further comprises securing the adapter card into a card connector of the computer chassis.

15. A bracket retainer for securing an adapter card in a computer chassis, the computer chassis comprising a panel, wherein the panel comprises an opening, and wherein a tab portion of the adapter card protrudes through the opening, the bracket retainer comprising:
   a rotating door structure attached to a surface of the panel, the rotating door structure forming a closure of the opening wherein the adapter card is secured when the tab portion of the adapter card is engaged by the rotating door structure, the rotating door structure including,
   a first door structure, the first door structure forming a closure of a first opening, the first door structure including a first retainer structure including,
   a first projection, wherein the first projection is capable of interlocking with a top cover of the computer chassis to secure the first door structure in a closed position, and
   a first means for attaching the first retainer structure to the computer chassis,
   a second door structure, the second door structure and the first door structure integrally attached to a surface of the panel, the second door structure forming a closure of a second opening; and
   a third structure disposed on a surface of the panel between the first opening and the second opening, wherein the first means for attaching the first retainer structure to the computer chassis and a first means for attaching a second retainer structure to the computer chassis are integral with the third structure wherein the first door structure is capable of rotating about the third structure to form the closure of the first opening and the second door structure is capable of rotating about the third structure to form the closure of the second opening; and a projection integral with the rotating door structure, wherein the projection is capable of securing the rotating door structure in a closed position.

16. A bracket retainer as recited in claim 15, wherein the projection is capable of interlocking with a lip portion of a top cover of the computer chassis to secure the rotating door structure in the closed position.

17. A bracket retainer as recited in claim 15, wherein the rotating door structure comprises a retainer structure and a spring structure and, wherein the retainer structure is formed of rigid material and the spring structure is formed of a flexible material.

* * * * *